3,453,075
PROCESS FOR MANUFACTURE OF CRYSTALLINE
PYROPHOSPHORIC ACID
Chung Yu Shen, St. Louis, Mo., assignor to Monsanto
Company, St. Louis, Mo., a corporation of Delaware
No Drawing. Filed Mar. 1, 1966, Ser. No. 530,768
Int. Cl. C01b 25/18
The portion of the term of the patent subsequent to
Mar. 5, 1985, has been disclaimed
U.S. Cl. 23—165                                          9 Claims

ABSTRACT OF THE DISCLOSURE

Form II pyrophosphoric acid is prepared by adding crystals of Form II pyrophosphoric acid sufficiently small to pass a U.S. Standard 2 mesh screen to liquid pyrophosphoric acid having a $P_2O_5$ content of from about 78.0 to about 82.0 weight percent and maintaining the temperature of the resulting blend from about 25° C. to the melting point of solid Form II $H_4P_2O_7$ until the liquid pyrophosphoric acid has been converted to solid Form II pyrophosphoric acid. The solid pyrophosphoric acid is a valuable intermediate for preparing phosphates useful as detergent builders.

---

The present invention relates to the manufacture of crystalline pyrophosphoric acid. More particularly, the present invention relates to processes for manufacturing crystalline pyrophosphoric acid of the so-called "high temperature" form, which is also often referred to as the "Form II" crystalline variety.

While crystalline pyrophosphoric acid ($H_4P_2O_7$) is a specific, readily identifiable, chemical compound having a $P_2O_5$ content of 79.76%, the material that is most commonly referred to as "pyrophosphoric acid" is a viscous, sticky liquid having a $P_2O_5$ content of from about 78 to about 82%, which liquid actually contains a mixture of specific phosphoric acids ranging from orthophosphoric acid through pyrophosphoric acid, tripolyphosphoric acid, tetrapolyphosphoric acid, etc. Because of the very nature of the material, whenever a $P_2O_5$—$H_2O$ composition having a $P_2O_5$ content above about 70 weight percent is in the liquid state, it is invariably a mixture of acids; the particular identity of the mixture depending largely upon the $P_2O_5$ content of the "poly-acid" material. Thus, the liquid polyphosphoric acid commonly referred to as "pyrophosphoric acid" (having a $P_2O_5$ content of about 80 weight percent) usually contains about 17 weight percent of orthophosphoric acid ($H_3PO_4$), about 42 weight percent of pyrophosphoric acid ($H_4P_2O_7$), about 25 weight percent of tripolyphosphoric acid ($H_5P_3O_{10}$), about 10 weight percent of tetrapolyphosphoric acid ($H_6P_4O_{13}$), and a total of about 6 weight percent of still higher chain length polyphosphoric acid.

The liquid polyphosphoric acids (including liquid "pyrophosphoric acid") are most economically manufactured by reacting $P_2O_5$ with water, the particular amount of water used depending upon the particular polyphosphoric acid desired. Because of the potential economic advantage that reacting $P_2O_5$ with water and subsequently "neutralizing" the resulting "pyrophosphoric acid" with an appropriate base has to offer (over other processes for making pyrophosphates such as dicalcium pyrophosphate and tetrasodium pyrophosphate) attempts have been made heretofore to utilize liquid "pyrophosphoric acid" as a raw material in the manufacture of various useful pyrophosphate salts. Such attempts have generally failed due to the fact that liquid "pyrophosphoric acid" is a mixture of acids. "Neutralization" of these acids with bases simply yielded products that were also mixtures of various salts of ortho- and poly-phosphoric acid, rather than the desired relatively pure pyrophosphates.

Although the "Form II" variety of crystalline pyrophosphoric acid (which melts at about 71° C.) is believed to be more desirable from a commercial processing standpoint since it is considered more stable than the "low temperature" ("Form I") form (which melts at about 54° C.), prior to the present invention there has not been reported a method for manufacturing relatively pure crystalline "Form II" pyrophosphoric acid in a relatively simple, easily and straightforward manner and particularly a relatively pure crystalline "Form II" pyrophosphoric acid in a particulated form.

It has now been discovered that crystalline "Form II" pyrophosphoric acid can be manufactured in a commercially practical manner provided that certain critical process elements are controlled within certain prescribed limits. Briefly stated, it has now been discovered that by blending together (1) solid, particulated "Form II" pyrophosphoric acid and (2) liquid "pyrophosphoric acid" containing a certain critical amount of $P_2O_5$ so that the weight ratio of (1) to (2) falls within certain prescribed limits, and by maintaining the temperature of the resulting blend within a fairly limited range for a period of time, practically pure crystalline "Form II" pyrophosphoric acid can be produced. The process elements that must be controlled in the present processes are:

(a) the $P_2O_5$ content of the "liquid pyrophosphoric acid,"
(b) the initial particle size of the solid particles of "Form II" material,
(c) the initial weight ratio of solid particles of "Form II" pyrophosphoric acid to "liquid pyrophosphoric acid,"
(d) the temperature of the reaction mixture [during the conversion of the "liquid pyrophosphoric acid" to the desired crystalline ("Form II") form] and
(e) the atmosphere over the reaction mixture during the conversion.

The liquid "pyrophosphoric acids" that are useful in the processes of the present invention are those polyphosphoric acids (sometimes called "superphosphoric acids") that contain from about 78.0 to 82.0 weight percent of $P_2O_5$. It is preferred, however, that liquid "pyrophosphoric acids" containing from about 79.8 to about 80.2 weight percent of $P_2O_5$ be utilized. The use of superphosphoric acids containing more than about 82.0% of $P_2O_5$ or less than about 78.0% of $P_2O_5$ will result, initially, in at least partial dissolution of the solid, particulated "Form II" material when it is intermixed therewith.

It has been found that not only is the size of the solid particles of "Form II" $H_4P_2O_7$ (that are to be used in the present processes) important, but also the total amount of solid particles that is used, as compared with the amount of liquid "pyrophosphoric acid" used in these processes. Thus, while no lower limit is known regarding the average size of the solid particles of "Form II" $H_4P_2O_7$ that can effectively be used in these processes it appears that, as an upper limitation, at least about 80 weight percent of these particles must be small enough to pass through a U.S. Standard 2 mesh screen. Particularly good results can be obtained by using particles small enough so that at least 80 weight percent of them can be passed through a U.S. Standard 8 mesh screen. As a practical matter, generally at least 50 weight percent of these solid particles of "Form II" $H_4P_2O_7$ should be large enough to be retained on a U.S. Standard 320 mesh screen.

It has also been found that, apparently because the desired conversion reaction is delayed by a long induction time and is diffusion controlled to at least some extent, the amount of solid particles of "Form II" $H_4P_2O_7$ in the reaction mixtures should be greater than about 10% by weight of the reaction mixtures. Preferably the weight ratio of liquid "pyrophosphoric acid" to solid particles of Form II $H_4P_2O_7$ in the reaction mixtures are within the range of from about 1:1 to about 1:50. Still further preferred are those initial mixtures containing from about 1:4 to about 1:20. Generally, the lower this ratio (liquid: solid), the longer the reaction time necessary to convert the liquid "pyrophosphoric acid" to the desired "Form II" ("high temperature") crystalline form. However, when the ratio is significantly below about 1:1, process difficulties are encountered in the reaction system such as the reactants passing through a "difficult to blend" phase requiring extraordinary amounts of power for the blender or stirrer to function in properly blending the reactants. In addition, when the amount of solid particles of "Form II" $H_4P_2O_7$ in the reaction mixtures is below about 10% by weight, the reaction time (for essential completion of the desired conversion) becomes inordinately long, to such an extent that the time required for conversion becomes impractical.

During the initial preparation of the reaction mixtures described above and during the reaction period (in which the desired conversion is taking place), the temperature of these reaction mixtures must be maintained from above about 25° C. to below the melting point of Form II $H_4P_2O_7$. In those instances where mixing and/or heat transfer (i.e., between the walls of the reactor and the reaction mixtures) are not of optimum efficiency, it is preferred that the temperature of the reaction mixture be maintained during the conversion reaction between about 50 and about 65° C. In fact, it is generally preferred that this relatively narrower temperature range be observed during the successful practice of the processes of this invention.

Referring now to the amount of time necessary to convert all of the liquid "pyrophosphoric acid" in the above-described reaction mixtures to the desired "Form II" crystalline variety, it has been found that, when the critical elements described above are observed, this can be accomplished in as short a period as about 1 minute, or as long as about 6 hours. Generally, higher proportions of solid, particulated "Form II" $H_4P_2O_7$ (in the reaction mixtures), higher temperatures (within the critical range set out above), and smaller average particle sizes of the solid, particulated "Form II" $H_4P_2O_7$ all contribute to relatively shorter "reaction times".

The present processes can be practiced successfully using either batch or cyclical techniques in, for example, conventional stainless steel or glass-lined chemical reactors. Generally, it is preferred that the liquid "pyrophosphoric acid" and the solid, particulated "Form II" $H_4P_2O_7$ be blended for at least 30 seconds in order to form a fairly uniform blend of these materials. Such mixing can be obtained, for example, in any conventional "ribbon" type mixer. During the "conversion" stage of these processes, mechanical mixing or other agitation is preferred but is not absolutely necessary, so long as the proper temperature of the reaction mixtures is maintained. Additionally, in place of mechanical mixing or in combination therewith a particulated mass, for example, a fluidized bed in which the solid particles are maintained in a relatively free flowing state by a stream of dry air, can be used during the "conversion" stage of these processes.

A distinct advantage of the process of the present invention is that particulated, relatively free-flowing "Form II" $H_4P_2O_7$ crystals can be prepared. Usually such crystals are granular solids in the size range of from sand-like to pea-like, generally averaging below about ¼" diameter in size (small enough to pass through a U.S. Standard 2 mesh screen) and ranging to as fine as particles small enough to pass through a U.S. Standard 20 mesh screen or finer.

The crystalline "Form II" pyrophosphoric acid prepared by the processes of the present invention can be generally characterized by its melting point of about 71° C. and/or its distinctive X-ray diffraction pattern which is presented in the following table:

TABLE.—X-RAY DIFFRACTION DATA [a] FOR FORM II $H_4P_2O_7$

| Line [b] | d, A. |
|---|---|
| 1 | 3.22 |
| 2 [c] | 4.83 |
| 3 [c] | 4.58 |
| 4 | 3.30 |
| 5 | 3.85 |
| 6 | 3.51 |
| 7 [c] | 4.75 |
| 8 [c] | 2.74 |
| 9 [c] | 5.35 |
| 10 [c] | 3.78 |
| 11 | 5.49 |
| 12 | 2.63 |
| 13 | 3.16 |
| 14 | 2.65 |
| 15 [c] | 1.96 |
| 16 [c] | 1.92 |
| 17 [c] | 3.03 |
| 18 [c] | 2.20 |

[a] $CuK\alpha$ radiation.
[b] Eighteen strongest lines in order of decreasing intensity.
[c] Lines 2 and 3 are about equal intensity; lines 7 and 8 are about equal intensity; lines 9 and 10 are about equal intensity; lines 15 and 16 are about equal intensity; lines 17 and 18 are about equal intensity.

Additionally, it should be noted that in practicing the process of the present invention extreme care should be exercised to prevent the admission of significant amounts of moisture in the equipment that is utilized. Because of the hydroscopicity of the liquid pyrophosphoric acid and the solid Form II $H_4P_2O_7$, a relatively moisture-free air, such as that obtained by contacting air with a desiccant, including a liquid pyrophosphoric acid, can be used to reduce the tendency of moisture ladden air to accumulate in the equipment. If liquid pyrophosphoric acid is used to dry the air, the acid concentration should be high enough to compensate for the moisture absorbed from the air so that the resulting liquid pyrophosphoric acid is within the limits ($P_2O_5$ basis) as defined herein. In any event, the entire process should be practiced under an essentially anhydrous atmosphere.

In the following examples, all parts given are by weight unless otherwise specified.

Example I

Into a conventional reactor provided with a proper acid resistant coating and fitted with a fairly efficient stainless steel stirrer (and a cover to prevent the leakage of moist air into the reactor) are poured, 1,000 parts of −20 mesh crystalline Form II pyrophosphoric acid. These crystals are then stirred while 200 parts of liquid "pyrophosphoric acid" (containing 80.1 weight percent of $P_2O_5$ and at a temperature of 58° C.) are poured onto these crystals (over a period of 5 minutes). Care is taken to avoid excessive contamination of the materials or the reactor with moisture to cause a drop in the assay of the resulting crystalline product from the desired value of about 95% $H_4P_2O_7$. The resulting mixture is then stirred for a period of 10 minutes. During this period of time, dry air is continually streamed over the conversion reaction mixture to keep away moisture. During the conversion reaction period the temperature of the reaction mixture is maintained at about 60° C. by circulating cooling water through the jacket of the reactor. At the end of this reaction period, the material in the reactor is solid crystalline, particulated "Form II" $H_4P_2O_7$. It is stored for future use in moisture-proof containers.

Example II

Into the lower end of a slightly slanted conventional rotary, stainless steel, tube-type reactor (fitted with internal flights designed to increase solid to cool air contact to remove the heat of crystallization) is charged, continuously a blend consisting of (1) liquid "pyrophosphoric acid" containing 79.9% of $P_2O_5$ and (2) solid, particulated —2 mesh "Form II" $H_4P_2O_7$ in a weight ratio, respectively, of 1:15. The temperature of this blend is about 60° C. when it is charged into the reactor. In the reactor the temperature of the reaction mixture is maintained at about 60–61° C. by cooling with a counter current flow of a dry air stream. The average residence time of reactants in the reactor is about 20 minutes. By the time the reaction mixture reaches the discharge end of the reactor, it is practically pure crystalline "Form II" $H_4P_2O_7$ in a granular physical condition. This product is removed from the upper end of the reactor, split into two portions having a weight ratio of 15:1. The larger of these portions is blended continuously in a pug mill with a liquid "pyrophosphoric acid" feed that contains 79.9% of $P_2O_5$. The weight ratio of solid "Form II" $H_4P_2O_7$ to liquid "pyrophosphoric acid" in the resulting blend is 15:1 respectively. Note that this entire process is conducted in an essentially anhydrous air atmosphere. The small fraction of product from the reactor is collected for future use and stored in moisture-proof silos or storage bins.

What is claimed is:

1. A process for manufacturing crystalline Form II pyrophosphoric acid which comprises:
   (a) blending together under essentially anhydrous conditions (1) liquid pyrophosphoric acid having a $P_2O_5$ content of from about 78.0 to about 82.0 weight percent and (2) solid particles of Form II $H_4P_2O_7$; said particles of Form II $H_4P_2O_7$ being small enough to pass through a U.S. Standard 2 mesh screen and the amount of said solid particles of Form II $H_4P_2O_7$ in the resulting blend being greater than about 10% by weight of the resulting blend, and
   (b) maintaining the temperature of said resulting blend within the range of from about 25° C. to the melting point of solid Form II $H_4P_2O_7$ until said liquid pyrophosphoric acid has been converted to solid Form II $H_4P_2O_7$.

2. A process as in claim 1, wherein said liquid pyrophosphoric acid contains from about 79.8 to about 80.2 weight percent of $P_2O_5$.

3. A process as in claim 2, wherein the weight ratio of said liquid pyrophosphoric acid to said solid particles of Form II $H_4P_2O_7$ in said resulting blend is from about 1:1 to about 1:50.

4. A process as in claim 3, wherein said temperature is within the range of from about 50° C. to about 65° C.

5. A process as in claim 4, wherein said resulting blend is mixed while maintaining said temperature of step (b) until said liquid pyrophosphoric acid has been converted to solid, particulated Form II $H_4P_2O_7$.

6. A cyclical process for manufacturing solid, particulated Form II pyrophosphoric acid having an $H_4P_2O_7$ assay of at least about 95% which comprises:
   (a) forming a blend under essentially anhydrous conditions by intermixing (1) liquid pyrophosphoric acid having a $P_2O_5$ content of from about 78.0% to about 82.0 weight percent with (2) solid particles of Form II $H_4P_2O_7$ small enough to pass through a U.S. Standard 2 mesh screen; the initial weight ratio in said blend of said liquid pyrophosphoric acid to said solid particles of Form II $H_4P_2O_7$ being between about 1:1 and about 1:50;
   (b) agitating said blend and maintaining the temperature of said blend within the range of from about 25° C. to the melting point of solid Form II $H_4P_2O_7$ until said liquid pyrophosphoric acid is converted to solid Form II $H_4P_2O_7$ to thereby form a bed of solid, particulated Form II $H_4P_2O_7$;
   (c) separating said bed of solid, particulated Form II $H_4P_2O_7$ into a first fraction and at least one other fraction; and
   (d) intermixing said first fraction with liquid pyrophosphoric acid as in step (a) above; at least about 80 weight percent of the particles in said first fraction being small enough to pass through a U.S. Standard 2 mesh screen at the time said first fraction is intermixed with said liquid pyrophosphoric acid.

7. A process as in claim 6, wherein said liquid pyrophosphoric acid contains from about 79.8 to about 80.2 weight percent $P_2O_5$.

8. A process as in claim 7, wherein the weight ratio of said liquid phosphoric acid to said solid particles of Form II $H_4P_2O_7$ in said blend is from about 1:4 to about 1:20.

9. A process as in claim 8, wherein said temperature is within the range of from about 50° C. to about 65° C.

No references cited.

OSCAR R. VERTIZ, *Primary Examiner.*

ARTHUR GREIF, *Assistant Examiner.*